United States Patent
Jean et al.

(10) Patent No.: US 7,246,375 B1
(45) Date of Patent: Jul. 17, 2007

(54) METHOD FOR MANAGING A SECURE TERMINAL

(75) Inventors: Lionel Jean, Marseilles (FR); Jean-Claude Ouvray, Marseilles (FR)

(73) Assignee: Gemplus, Gemenos (FR)

( * ) Notice: Subject to any disclaimer, the term of this patent is extended or adjusted under 35 U.S.C. 154(b) by 0 days.

(21) Appl. No.: 09/462,925

(22) PCT Filed: Jul. 8, 1998

(86) PCT No.: PCT/FR98/01464

§ 371 (c)(1),
(2), (4) Date: Jun. 2, 2000

(87) PCT Pub. No.: WO99/03074

PCT Pub. Date: Jan. 21, 1999

(30) Foreign Application Priority Data

Jul. 10, 1997 (FR) .................................. 97 08813

(51) Int. Cl.
*G06F 21/00* (2006.01)
*G06F 21/20* (2006.01)
*G06F 21/24* (2006.01)

(52) U.S. Cl. ............................. 726/21; 726/20; 726/17; 726/16; 726/2; 726/4; 709/225; 713/163; 713/162; 235/382; 235/380

(58) Field of Classification Search ................. 713/200
See application file for complete search history.

(56) References Cited

U.S. PATENT DOCUMENTS

| | | | | |
|---|---|---|---|---|
| 4,879,645 A | * | 11/1989 | Tamada et al. ............. 235/380 |
| 5,229,764 A | * | 7/1993 | Matchett et al. ........... 340/5.52 |
| 5,845,069 A | * | 12/1998 | Tanaka ....................... 713/200 |
| 5,856,659 A | * | 1/1999 | Drupsteen et al. .......... 235/380 |
| 5,878,134 A | * | 3/1999 | Handelman et al. ......... 340/5.6 |
| 5,907,616 A | * | 5/1999 | Brogger et al. ............. 713/172 |
| 5,979,773 A | * | 11/1999 | Findley et al. .............. 235/492 |
| 6,055,638 A | * | 4/2000 | Pascal et al. ................ 713/201 |
| 6,151,647 A | * | 11/2000 | Sarat ........................... 710/301 |
| 6,199,128 B1 | * | 3/2001 | Sarat ........................... 710/301 |
| 6,226,744 B1 | * | 5/2001 | Murphy et al. ............. 713/200 |
| 6,328,217 B1 | * | 12/2001 | Everett et al. .............. 235/492 |
| 6,378,073 B1 | * | 4/2002 | Davis et al. ................ 713/200 |
| 6,393,567 B1 | * | 5/2002 | Colnot ........................ 713/182 |
| 6,405,369 B1 | * | 6/2002 | Tsuria ............................ 725/6 |
| 6,539,093 B1 | * | 3/2003 | Asad et al. .................. 380/279 |
| 7,159,243 B1 | * | 1/2007 | Muhlberger et al. .......... 726/21 |

FOREIGN PATENT DOCUMENTS

WO  WO 93/25024  * 12/1993

* cited by examiner

*Primary Examiner*—Syed A. Zia
(74) *Attorney, Agent, or Firm*—Buchanan Ingersoll & Rooney PC

(57) ABSTRACT

The invention concerns a method solving security problems resulting from the addition of a security circuit to a smart card reading terminal by providing said security circuit with means for counting the number of times the security circuit is activated for certain sensitive operations. When the total of said operations reaches a fixed value, the security circuit is prevented from operating until it is re-initialized again. Optionally, the circuit may have to be replaced by another.

23 Claims, 2 Drawing Sheets

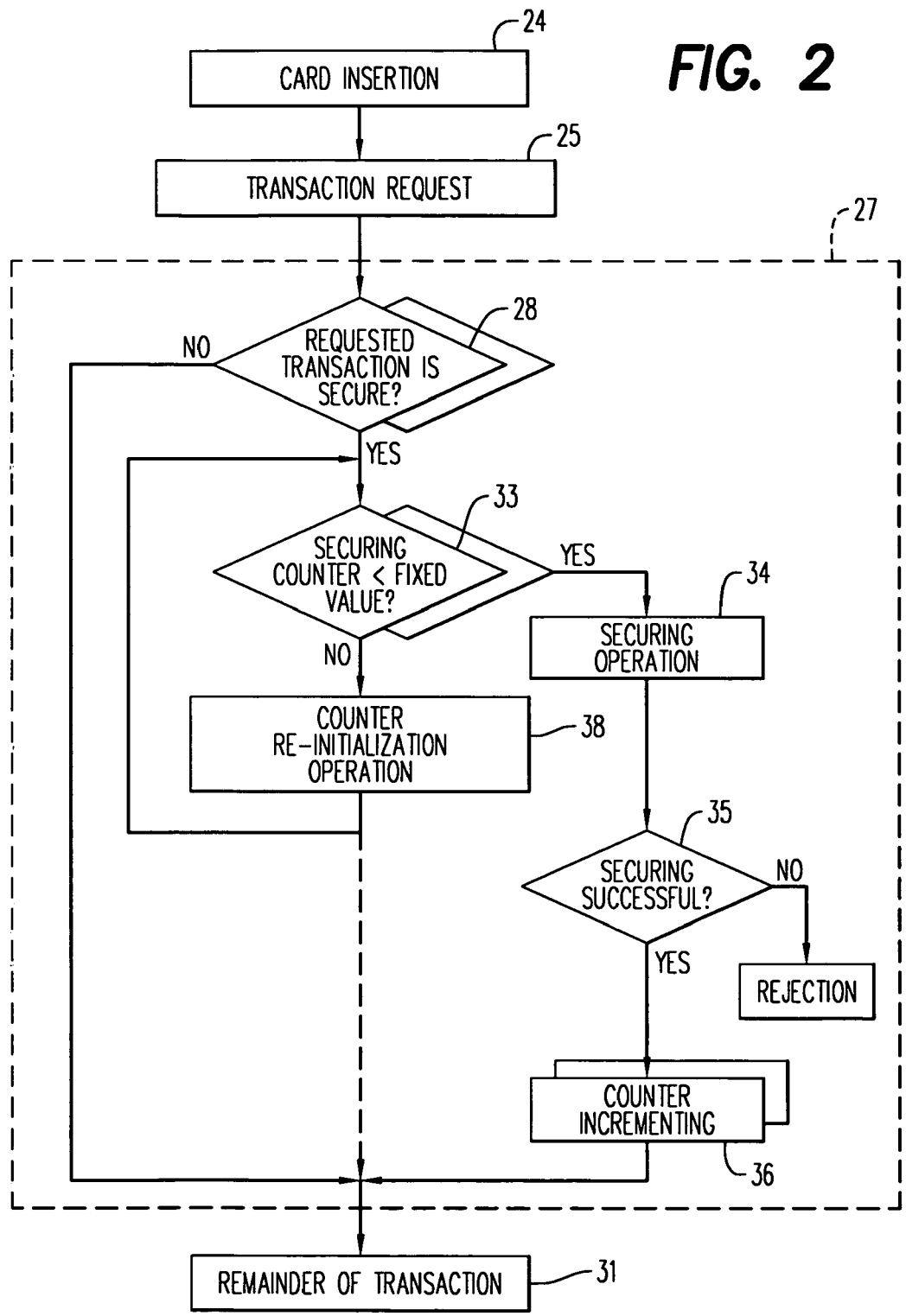

METHOD FOR MANAGING A SECURE TERMINAL

This application is based on French Patent Application No. 97/08813, filed on Jul. 10, 1997, which is incorporated by reference herein.

BACKGROUND

1. Field of the Invention

The object of the present invention is a method of managing a secure terminal also referred to as a reader, and a security circuit for implementing the method. It relates to the field of so-called smart microcircuit cards and more generally the field of portable smart objects. This field is the one by which, with electronic circuits, either carriers of smart cards are authenticated, or information contents contained by the memories of these cards are authenticated, or finally payments, or credit increases, are carried out by modifying a number stored in the card and representing payment units or loyalty points.

The object of the invention, in view of the very considerable development of transactions accessible with smart cards, is to make the read terminals, the available number of which is growing in parallel with the uses of smart cards, safer, to make them secure.

2. Related Background

A method of managing transactions using smart cards is for example described in European patent application EP-A-91 400 201.9 filed on Jan. 29, 1991.

The security systems in use at present have, in the readers, security circuits whose task is notably to control the execution of all these verification or authentication protocols executable by the reader. These security circuits, referred to as SAM (SECURE APPLICATION MICROMODULE) circuits, are generally removable and are connected to the reader in order on the one hand to provide this security operation control, and on the other hand to specify certain operations related to a particular application implemented by the reader. An application is a series of operations executed by a reader, or a device to which this reader is connected, and which leads to the satisfying of a requirement (in terms of goods or services) expressed by the carrier of the card. The removable nature of these security circuits makes them insecure as regards defrauders who are suspected of wishing to know the secret thereof. This will be even more achievable as the number of security circuits becomes large.

One aim of the invention is to guarantee that the terminals and the security modules are not used outside the application to which they are dedicated. This is because the illegal use of a security circuit, without a terminal, is critical from the security point of view since it is possible for a defrauder to have information on the secrets contained in the security circuit. The use of a terminal without its security circuit is generally of no interest since the terminal does not hold the secrets of the application. It is therefore not capable of doing much. The use of a terminal and its security circuit is furthermore in certain cases also critical. This is because the terminal plus security circuit assembly makes it possible to carry out complete operations on real cards. It is therefore essential to restrict the use of security circuits alone and security circuit plus terminal assemblies.

SUMMARY

In the invention, in order to remedy the problems cited, counting the number of times the security circuit is used for so-called sensitive commands is recommended. Sensitive commands will be considered to be commands making it possible notably to give access rights, to authenticate, to guarantee confidentiality, to produce cryptograms, to verify certificates, etc. In general, it will be possible to consider any command as sensitive. In this case its existence will be accompanied by an attribute which gives it, or does not give it, this nature.

In the invention, when the count of the number of uses of the security circuit reaches a fixed value, the operation of this security circuit is inhibited. In this case, this security circuit can no longer perform its security work. Under these conditions, each time a request is made to it by the terminal, the transactions carried out by the terminal, and for which its operation is required, are inhibited. In an improvement, of course, the counter of this security circuit can be re-initialized by complying with a procedure which is itself secure.

The object of the invention is therefore a method of managing a secure terminal used for transactions with smart cards having the following steps:
   a smart card is placed in contact with the terminal,
   the terminal is made to execute a program, this program including sensitive actions related to making the transactions secure,
   characterised in that
   the number of times a request is made to the terminal to execute sensitive operations is counted, and
   the action of this terminal is restricted as soon as this count reaches a fixed value.

In the meaning of the invention, there can be a request as soon as the terminal or the security module receives and identifies an instruction or a sensitive command. It is therefore possible to count the sensitive commands independently of their execution and/or the result of their execution.

An object of the invention is also a security circuit for implementing the above method. It is characterised in that it has management means capable of identifying and counting requests coming from outside and restricting its functions as soon as the count reaches a predetermined number. The requests can come either from the terminal, or from the master system, or from a terminal emulator which would be implemented by a defrauder.

BRIEF DESCRIPTION OF THE FIGURES

The invention will be better understood from a reading of the following description and from an examination of the accompanying figures. These are given for information only and are in no way limitative of the invention. The figures show:

FIG. 2: a flow diagram showing the main steps of the method of the invention;

DETAILED DESCRIPTION

Figure 1:
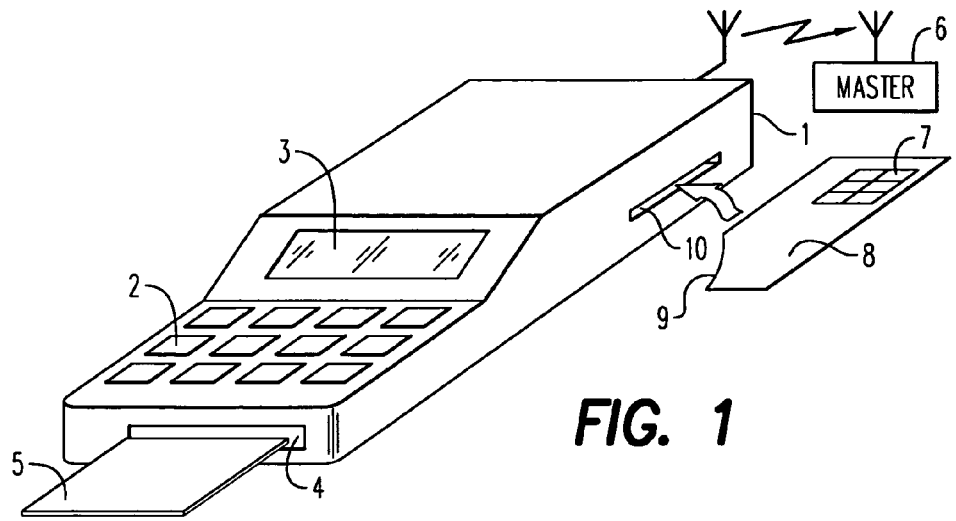
FIG. 1: a schematic representation of a terminal which can be used to implement the method of the invention.

FIG. 1 shows a terminal 1 which can be used to implement the method of the invention. The terminal 1 has, in a known manner, preferably, a keypad 2, a screen 3 and a slot 4 for inserting therein a smart card 5 to be read with the reader terminal 1. The terminal 1 can furthermore be connected with a master system 6. The connection can notably be of the telecommunication type, the master system 6 being remote. The telecommunications can for example be radio. The terminal 1 is however capable of performing a certain number of operations autonomously and it is these which are mainly concerned. In a particular example shown in FIG. 1, the security circuit which is usable in the terminal 1 is removable: it is a circuit 7 set in a portable smart object 8. The portable smart object 8 can have the same form as a smart card 5. Preferably, it has a different form with notably a geometric polarization part 9 for preventing users from putting it in incorrectly. The object 8 is intended to be inserted in a read slot 10 of the terminal 1 intended to receive it and it alone.

Figure 3:
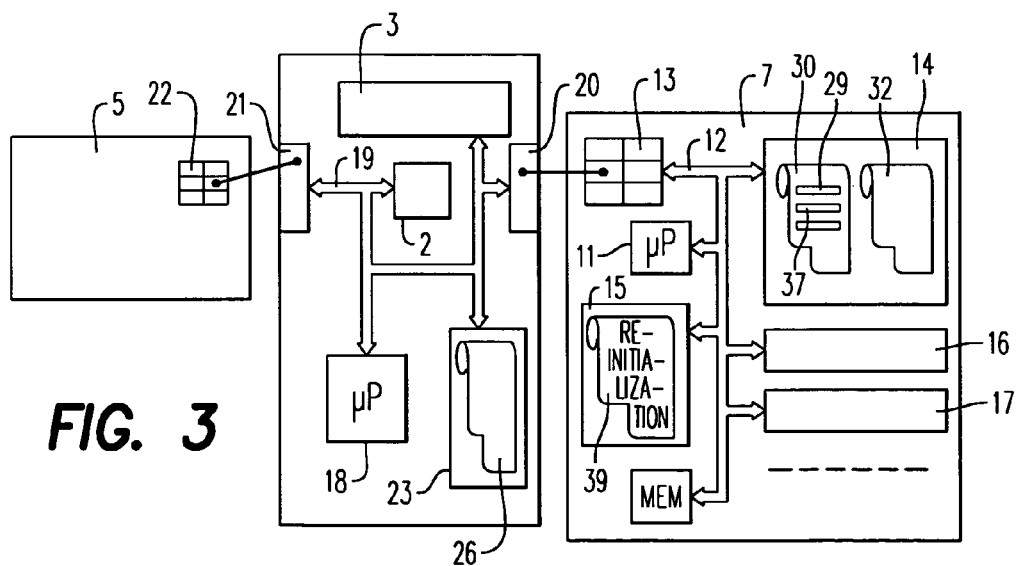
FIG. 3: the architecture of the electronic means implemented in the terminal of FIG. 1.

FIG. 3, shown below FIG. 1, shows for the corresponding parts the architecture of the electronic system thus constituted. The circuit 7 thus has, preferably, a microprocessor 11 connected by an address, data and control bus 12, on the one hand with an input/output interface 13 represented by a connector. The microprocessor is on the other hand connected with a set of memories 14 and 15 and counters 16 and 17.

In the same way, the electronic system of the reader 1 has a microprocessor 18 connected with a bus 19, of the same type as the bus 12, with two input/output interfaces respectively 20 and 21 for communicating with the circuit 7 on the one hand, and with an electronic microcircuit 22 of the smart card 5 on the other hand. The bus 19 is also connected with the keypad 2 and the screen 3. The microprocessor 18 furthermore executes programs which are contained in a program memory 23.

The physical structures of the microprocessors, program memories, buses and interfaces can be various. Preferably, the memories are non-volatile type memories. The counters 16 and 17 are non-volatile counters. They can be implemented with an abacus method: each incrementing of the counter amounting to causing the change in state of one of the memory cells of a register, serving as an abacus, and acting as the counter. When all the memory cells have toggled, the counter has reached the fixed value. Preferably, nevertheless, the counter can be implemented in the form of a recording recorded in a data memory 50 associated with counting software of the circuit 7. The counting software consisting, at each increment, in reading the former value of the counter, incrementing its value by units, and writing the new value of the counter in the place of this recording. In this case, the fixed value is contained in the counting software. In addition, the keypad 2 and screen 3 are necessary only inasmuch as the application implemented by the terminal 1 requires the display and entry of information of the carrier of the card. In certain cases they can be omitted, the exchange protocol between the card 5 and the terminal 1 being automatic.

FIG. 2 shows the main steps of the management method of the invention. During a step 24, an operator places a smart card 5 in contact with the terminal 1. The terminal 1, applying the instructions of its program 26 stored in the memory 23 and executed by the microprocessor 18, reacts to this insertion and makes a transaction request 25. This transaction request may be simply the configuration of the microprocessor 18 in order to make it available to the microprocessor 11. The transaction request can thus, for example in the case of verification of the carrier of a smart card, be the request for verification of the secret code of this carrier. In this case, the program 26 stored in the memory 23 has an instruction of the type: "Initiation of the operation of verification of the secret code of the holder by the security circuit 7". This transaction request sent by the microprocessor 18 to the microprocessor 11 may nevertheless be different and correspond to all the security operations mentioned above.

According to the invention, the security circuit 7 then performs the sequence of operations 27 of FIG. 2. During a first operation 28 of this sequence 27, the microprocessor 11 of the circuit 7 checks whether or not an instruction 29 of its security program 30 loaded in memory 14 is a sensitive type instruction. It is of the sensitive type if it is assigned for example an attribute, a flag, which is associated with it for that purpose. Such a flag can for example be a particular bit configuration of the instruction code of the instruction 29.

If it is not a sensitive type instruction, if it is not of the type for which it is necessary to count the number of times it has been implemented, the remainder of the transaction is immediate. The circuit 7 and/or the reader 1 then continue, by means of the operation 31, to operate as in the prior art. On the other hand, if the requested operation relating to the instruction 29 is a sensitive operation, the microprocessor 11 inserts, in the flow of the program 30, a program 32 for managing the counter itself also stored in the memory 14. In the program 32 there is a first test 33 by means of which it is sought to ascertain whether a security counter, for example the counter 16, has a value less than a value fixed in advance. If this is the case, the securing operation 34, necessitated by the instruction 29, is executed. In a conventional manner, the program 30 includes a verification 35 that the operation 34 was successful. If, during the corresponding test 35, it is detected that the securing operation 34 was not successful, the circuit 7 delivers a rejection signal transmitted by means of the connector 13 to the interface 3. In this case the terminal 1 produces on the screen 3 a message indicating failure.

Making secure can for example concern verification that a secret code typed on the keypad 2 by a user corresponds to a secret code stored in the circuit 22 of the card 5.

On the other hand, if the operation 34 was successful, then there is decided upon, according to the invention, an operation 36 of increasing the content of the counter 16. After the incrementing 36 of the counter 16, the program 32 ends at the operation 31 as before.

In FIG. 2, as regards the operations 28, 33 and 36, a duplication of these operations has been shown. This is to be related to the existence of another counter: counter 17. This is because, according to the invention, provision is made to classify the transaction requests, depending on their nature, into a number of classes. There can, for example, be the authentication class, the encryption class, the cryptogram decryption class (certificate reading) and so on. There are then created as many counters 16, 17 as there are classes managed by the tests 28. A different counter is preferably allocated to each class. Here, two classes corresponding to the counters 16 and 17 have been shown. In other words, the test 28 will seek to ascertain whether the requested transaction 25 is a transaction corresponding to an instruction 29 or whether it is furthermore a transaction corresponding to another instruction 37 of the program 30. The counter 16 counts the number of times the instruction 29 is used, and the counter 17 counts the number of times the instruction 37 is used. The class is differentiated in the attribute.

It has been preferred to increment the counter after verification 35 that the securing operation 34 had been successful so as not to unnecessarily count operations in the security circuit 7 installed in the reader 1 if an operator makes a mistake during the operation 34 while entering his code number with the keypad 2. The position of the operation 36 in the tree structure issuing from the operation 33 can nevertheless be any position, for example situated between the step 33 and the step 34. According to what has just been said, preferably it is situated at the end of this tree structure.

The values of the counters 16 or 17 are not less than the fixed value when, at a previous transaction, they have reached this fixed value. In this case, in an operation 38, corresponding to a subprogram 39 stored in the memory 15, the re-initialization of the counter 16 or 17 concerned is caused. This re-initialization operation is in no way different, in the invention, from the forms it can otherwise have in a known manner in the prior art. The subprogram 39 can have notably a secure procedure, in particular verifications of secret codes as will be explained below.

These programs 30, 32 and 39 may be included in a single main program. The representation thereof which is given here is indicated in order to show clearly the contribution of the invention. In the prior art, only the program 30 existed. In the invention there exist in addition the program 32 for implementing the new operations 33 and 36 and the program 39 for performing the operation 38.

Figure 4:
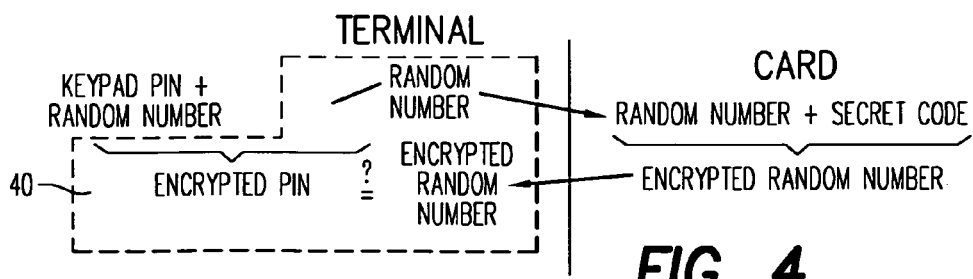
FIG. 4: an example of a sensitive security operation performed by the security circuit of the invention.

By way of example, an authentication operation between a terminal 1 and a card 5 is shown in FIG. 4. In this, the terminal 1 sends a random number, a string of characters, always different from one session to another, to the smart card 5. The card 5 receives, in its circuit 22, the value of this random number. The card 5 possesses means, notably in general a microprocessor of the same type as the microprocessors 11 and 18, and furthermore secret information, a secret code. The card microprocessor is capable of implementing an encryption algorithm for encrypting the random number as a function of the value of the secret code. This encryption results in an encrypted random number produced by the card. The card then transmits the encrypted random number from its connector to the interface 21 of the terminal 1. The terminal 1 is capable of performing an encryption of the random number (it knows it since it itself produced it) by a Personal Identification Number (PIN) typed on the keypad by the user. This last encryption results in an encrypted PIN. The terminal 1 then causes the comparison of the encrypted random number with the encrypted PIN. If the comparison is positive, the remainder of the transaction takes place, otherwise the terminal 1 causes the rejection thereof.

These operations shown thus under the reference 40 are typically sensitive operations performed by the security circuit 7 inside the terminal 1.

In a comparable manner, provision can be made that a combination of keys on the keypad 2 leads to an operation 38 of re-initialization of the counter or counters 16 or 17. This operation 38 will include, with this aim, a request, displayed on the screen 3 of the terminal 1, made to the operator to enter a secret re-initialization number. This secret number will not be a PIN number but something equivalent. Once this secret number has been entered and a validation key on the keypad 2 pressed, the circuit 7 will perform the comparison, direct in this case, of the secret number entered with an expected number stored in its memory 50. If the comparison is positive, the selected counter is re-initialized. It is available for the same number of transactions.

Preferably, the re-initialization is performed remotely by a master system, for example following an operation of collecting daily transaction data.

In order to prevent the defrauder using a reader 1 for attempting, fraudulently, to reactivate the circuit 7, provision can be made, in the operation 38, for another counter in the circuit 7, for example restricted to three operations, above which the circuit 7 will be permanently disabled if the secret number entered is false three times in succession. This counting up to three can be performed by the terminal 1 (in its program 26); it is preferably performed by the circuit 7 itself. In a variant, the circuit 7 can be used once only; as soon as the counter 16 or 17 is inhibited, it is necessary to replace it with a new circuit 7. If need be, a procedure of erasing the content of the SAM, in particular encryption algorithms and secrets, is automatically initiated.

By acting in this way it is realized that a defrauder will have only a limited number of accesses to the security circuit 7. Above this, the circuit 7 will disable all readers 1 into which it is inserted.

In an example, a sensitive action is therefore an authentication of a carrier of the smart card. In another example, a sensitive operation can quite simply be a cryptogram of certain data, or a mutual authentication procedure. Data are thus transmitted to the security circuit 7 which retrieves them in an encrypted form, usable with a view to their transmission, or their storage in the smart card 5. In the field of the electronic purse, provision is made for the smart card to have a state of the balance of the purse and a certificate. The certificate is a cryptogram representing the consistency of the balance of the purse with information relating to the card, for example its serial number, and variable information, for example an operation counter which counts the number of times the purse has been used. The cryptogram verification operation, a sensitive operation, performed by the secure circuit, consists in recalculating the certificate on these bases, and in verifying that the one recorded in the purse smart card is the same.

For restricting the operations, they can already be prevented completely. This is what has been seen so far. Nevertheless, and this is depicted schematically by the dashed link 41 in FIG. 2, a degraded operation of the terminal 1 can be accepted. In this degraded operation, of course, no sensitive operation can be performed. On the other hand, harmless operations, display of the account balance, transmission of non-confidential information (serial number, bank account number, name and address of the carrier) can be allowed. In this case, the program 26 can continue to run in accordance with what was provided for by its designer. This is because the program 26 represents one part of the application and it is possible that certain actions can be executed even if in other respects it has not been possible to verify other sensitive operations. The other part of the application is contained in the program 30.

The invention claimed is:

1. A method of managing a secure terminal used for transactions with smart cards, comprising:
   providing the terminal with a removable electronic security circuit,
   detecting placement of a smart card in contact with the terminal,
   executing a program by the terminal, said program including sensitive operations related to making the transactions secure,
   counting in said security circuit the number of requests for sensitive operations which are made to said security circuit or sensitive operations executed by said security circuit, and
   restricting the action of said terminal when the counted number reaches a predetermined value.

2. A method of managing a secure terminal used for transactions with smart cards, comprising:
   detecting placement of a smart card in contact with the terminal, executing a program by the terminal, said program including sensitive operations related to making the transactions secure,
dividing the sensitive operations into a number of classes,
counting, externally of the smart card, the number of times a request is made to the terminal to execute sensitive operations for each class, and
restricting the action of said terminal when the counted number reaches a predetermined value.

3. A method according to claim 1, further comprising:
as a sensitive operation, performing a mutual identification procedure between the terminal and the card.

4. A method according to claim 1, further comprising:
as a sensitive operation, performing an authentication of a carrier of the smart card.

5. A method according to claim 1, further comprising:
as a sensitive operation, performing a verification of a certificate coming from a smart card.

6. A method of managing a secure terminal used for transactions with smart cards, comprising:
detecting placement of a smart card in contact with the terminal,
executing a program by the terminal, said program including sensitive operations related to making the transactions secure,
counting, externally of the smart card, the number of times a request is made to the terminal to execute sensitive operations,
restricting the action of said terminal when the counted number reaches a predetermined value, and
re-initializing the counted number by a secure procedure including a verification of a secret code by the terminal or a security circuit.

7. A method according to claim 6, wherein the secure procedure includes a verification of a secret code by the terminal or the security circuit.

8. A method according to claim 6, wherein the re-initialization is performed remotely by a master system.

9. A method of managing a secure terminal used for transactions with smart cards, comprising:
detecting placement of a smart card in contact with the terminal,
executing a program by the terminal, said program including sensitive operations related to making the transactions secure,
counting, externally of the smart card, the number of times a request is made to the terminal to execute sensitive operations,
incrementing the counted number after a successful sensitive operation, and
restricting the action of said terminal when the counted number reaches a predetermined value.

10. A method of managing a secure terminal used for transactions with smart cards, comprising:
detecting placement of a smart card in contact with the terminal,
executing a program by the terminal, said program including sensitive operations related to making the transactions secure,
counting, externally of the smart card, the number of times a request is made to the terminal to execute sensitive operations, and
preventing only secure operations of the executing program when the counted number reaches a predetermined value.

11. A security circuit for implementing the method according to claim 1, comprising management means that is capable of:
identifying and counting requests coming from outside the security circuit, and
restricting functions of said security circuit as soon as the counted number reaches a predetermined number.

12. A method according to claim 1, further comprising:
dividing the sensitive operations into a number of classes and
establishing a count for each class.

13. A method according to claim 12, further comprising:
as a sensitive operation, performing a mutual identification procedure between the terminal and the card.

14. A method according to claim 13, further comprising:
as a sensitive operation, performing an authentication of a carrier of the smart card.

15. A method according to claim 12, further comprising:
as a sensitive operation, performing a verification of a certificate coming from a smart card.

16. A method according to claim 12, wherein a counter is re-initialized by a secure procedure including a verification of a secret code by the terminal or the security circuit.

17. A method according to claim 16, wherein the secure procedure includes a verification of a secret code by the terminal or the security circuit.

18. A method according to claim 16, wherein the re-initialization is performed remotely by a master system.

19. A method according to claim 12, wherein a counter is incremented after a successful sensitive operation.

20. A method according to claim 12, wherein for restricting, only secure operations of the executing program are prevented.

21. A security circuit for implementing the method according to claim 12, comprising management means that is capable of:
identifying and counting requests coming from outside the security circuit, and
restricting functions of the security circuit as soon as the counted number reaches a predetermined number.

22. A method according to claim 18, wherein a counter is incremented after a successful sensitive operation.

23. A method according to claim 18, wherein for restricting, only secure operations of the executing program are prevented.

* * * * *